United States Patent
Mina

(10) Patent No.: US 6,979,154 B2
(45) Date of Patent: Dec. 27, 2005

(54) FOUR-SIDED INSERT FOR MILLING CUTTERS WITH NEGATIVE RADIAL ANGLE OF THE CUTTING EDGES FOR THREE-DIMENSIONAL MILLING FROM THE SOLID

(76) Inventor: Livio Mina, Via dei Mille, 22, 25122 Brescia (IT)

( * ) Notice: Subject to any disclaimer, the term of this patent is extended or adjusted under 35 U.S.C. 154(b) by 60 days.

(21) Appl. No.: 10/364,620

(22) Filed: Feb. 12, 2003

(65) Prior Publication Data

US 2003/0152430 A1 Aug. 14, 2003

(30) Foreign Application Priority Data

Feb. 14, 2002 (IT) .................................. MI2002A000294

(51) Int. Cl.[7] .................................................. B23C 5/20
(52) U.S. Cl. ........................... 407/113; 407/34; 407/42
(58) Field of Search ............................. 407/34, 42, 48, 407/53, 61, 113

(56) References Cited

U.S. PATENT DOCUMENTS

| | | | | |
|---|---|---|---|---|
| 3,229,349 A | * | 1/1966 | Leksell ......................... | 407/113 |
| 3,818,562 A | * | 6/1974 | Lacey ........................... | 407/40 |
| 3,955,259 A | * | 5/1976 | Gustafsson .................... | 407/37 |
| 4,597,695 A | * | 7/1986 | Johnson ........................ | 407/113 |
| 4,934,880 A | * | 6/1990 | Stashko ........................ | 407/113 |
| 5,454,670 A | * | 10/1995 | Noda et al. .................... | 407/42 |
| 5,593,255 A | * | 1/1997 | Satran et al. ................. | 407/113 |
| 5,597,271 A | * | 1/1997 | Men et al. .................... | 407/113 |
| 5,720,583 A | * | 2/1998 | Bohnet et al. ................. | 407/42 |
| 5,971,672 A | * | 10/1999 | Hansson ....................... | 407/114 |
| 5,984,592 A | * | 11/1999 | Harper et al. .................. | 407/40 |
| 6,053,672 A | * | 4/2000 | Satran et al. ................. | 407/40 |
| 2002/0192041 A1 | * | 12/2002 | Wallstrom .................... | 407/35 |
| 2003/0002931 A1 | * | 1/2003 | Popke ........................ | 407/113 |

FOREIGN PATENT DOCUMENTS

EP 585871 A1 * 3/1994 ............. B23C/5/22

* cited by examiner

Primary Examiner—A. L. Wellington
Assistant Examiner—Dana Ross
(74) Attorney, Agent, or Firm—Guido Modiano; Daniel O'Byrne; Albert Josif

(57) ABSTRACT

A four-sided insert for milling cutters with negative radial angle of the cutting edges for three-dimensional milling from a solid, which has an upper face, or rake face, that is delimited by four sides that constitute the cutting edges of the insert. The four sides are opposite in pairs and connected to corresponding sides of the lower face by lateral faces. Two opposite sides of these four sides constitute main cutting edges of the insert and the other two sides constitute secondary cutting edges. The lateral faces that connect the main cutting edges to the lower face of the insert have, proximate to one end or tip of the cutting edge, a positive lower relief angle that is greater than the lower relief angle, which can be positive or negative or nil, proximate to the other end or tip of the cutting edge.

13 Claims, 3 Drawing Sheets

FOUR-SIDED INSERT FOR MILLING CUTTERS WITH NEGATIVE RADIAL ANGLE OF THE CUTTING EDGES FOR THREE-DIMENSIONAL MILLING FROM THE SOLID

BACKGROUND OF THE INVENTION

The present invention relates to a four-sided insert for milling cutters with negative radial angle of the cutting edges for three-dimensional milling from the solid. In particular, the invention relates to a four-sided insert to be mounted on a milling cutter with a registration angle χ, i.e., the angle between the main active cutting edge and the front surface, of substantially 90°, with a highly negative radial angle $r_e$ for three-dimensional milling of slots from the solid, i.e., without having to form a pre-bore beforehand. Moreover, in the insert according to the invention it is possible to use all the faces of the insert as cutting edges.

As is known, in milling cutters a highly negative radial angle $r_e$ is used mainly to allow the production of milling cutters that have a large number of cutting edges while maintaining high strength in the region underlying the insert and in order to facilitate manufacturing and reduce its cost.

Four-sided inserts currently used to mill recesses are generally diamond-shaped. They have two opposite long sides, which constitute the main cutting tips (commonly known as cutting edges), and two short sides, which constitute the secondary cutting edges. The point, or rather the region, where a long cutting edge and a short cutting edge meet is the tip of the cutting edge (outer tip). Particular care is given to the shape of this region, since it is important in order to achieve some of the goals of the machining process, such as for example the quality of the milled surface and the strength of the tip proper, while no particular care is given to the opposite end of the short side (inner tip) because it is not used in cutting.

Inserts of this kind are well-suited for face milling or climb milling, but for ramp milling, i.e., for three-dimensional milling, they require use on milling cutters with a radial angle $r_e$ of the cutting edges that is substantially positive or nil.

In order to perform ramp milling, inserts have been designed which have a small protrusion or tooth at the region of the secondary cutting edge that joins the tip of the cutting edge (outer tip). However, this refinement allows to perform only ramp milling operations with very shallow inclinations, unless a pre-bore is produced which allows to engage in cutting only a portion of the secondary cutting edge, leaving free the end (inner tip) of the secondary cutting edge that lies opposite the tip of the cutting edge (outer tip). This accordingly prevents milling from the solid. Moreover, the presence of the tooth greatly limits the possibility to use on another milling cutter the short side as a peripheral cutting edge, thus halving the possibility to use the insert.

SUMMARY OF THE INVENTION

The aim of the present invention is to solve the problems described above, by providing a four-sided insert that allows to produce three-dimensional millings from the solid even on cutters having a negative cutting edge radial angle, maintaining the possibility to use all the sides of the insert.

Within this aim, an object of the invention is to provide an insert that allows to perform three-dimensional ramp millings from the solid even with a steep inclination.

Another object of the invention is to provide an insert that can have an adequate mechanical strength and can be manufactured at competitive costs.

This aim and these and other objects that will become better apparent hereinafter are achieved by a four-sided insert for milling cutters with negative radial angle of the cutting edges for three-dimensional milling from the solid, which has an upper face, or rake face, that is delimited by four sides that constitute the cutting edges of the insert, said four sides being opposite in pairs and being connected to corresponding sides of the lower face by lateral faces, two opposite sides of said four sides constituting the main cutting edges of the insert, the other two sides constituting the secondary cutting edges, characterized in that the lateral faces that connect said main cutting edges to the lower face of the insert have, proximate to one end or tip of the cutting edge, a positive lower relief angle that is greater than the lower relief angle proximate to the other end or tip of said cutting edge.

BRIEF DESCRIPTION OF THE DRAWINGS

Further characteristics and advantages of the invention will become better apparent from the description of some preferred but not exclusive embodiments of the insert according to the invention, illustrated by way of non-limitative example in the accompanying drawings, wherein.

DESCRIPTION OF THE PREFERRED EMBODIMENTS

Some identifying aspects of the insert according to the invention are defined first in order to better clarify the particularities of the invention with reference to the cited figures.

Figure 1:
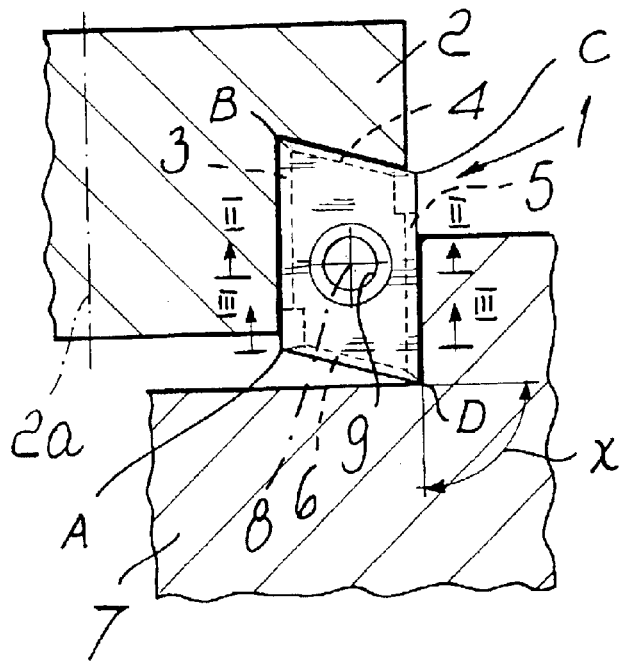
FIG. 1 is a schematic sectional view of a portion of a milling cutter, taken along a radial plane, on which an insert according to the invention with a positive lower relief angle is mounted.

FIG. 1 illustrates an insert according to the invention, generally designated by the reference numeral 1, which is mounted on a milling cutter 2 that can be rotationally actuated about its own axis 2a. The insert 1 is constituted by a plate, which rests with its lower face against a seat or supporting surface provided in the body of the milling cutter 2. Since it is a four-sided insert, the upper face, or rake face, of the insert 1 is delimited by four sides AB, BC, CD, DA. In the illustrated embodiments, the insert according to the invention has a diamond-shaped upper face, but it might also have a rectangular, rhomboidal or square shape. For this reason, the description that follows refers to a generic four-sided configuration.

The four sides are mutually opposite and generally parallel in pairs and are connected to the lower face of the insert by lateral faces 3, 4, 5, 6, which are inclined with respect to an imaginary plane that is perpendicular to the upper surface of the insert. The upper surface of the insert can coincide with the upper face of the insert when said upper face is flat.

The four sides AB, BC, CD, DA of the insert constitute the cutting tips of the insert, and the angle formed by the lateral face, which protrudes from each one of the cutting tips, with an imaginary plane that is perpendicular to the upper surface of the insert constitutes the lower relief angle $\alpha$, $\alpha_i$ of that cutting tip. In the insert according to the invention of this example, the lower relief angles $\alpha$, $\alpha_i$ of the cutting edges, according to the typical definition of the field of cutting tools, are positive.

Two opposite cutting tips constitute the main cutting edges of the insert, while the other two constitute its secondary cutting edges. In the illustrate insert, the main cutting edges of the insert are the sides CD and AB, while the secondary cutting edges are the sides AD and BC.

In FIG. 1, the main cutting edge CD and the secondary cutting edge AD are in the active or utilization position, while the cutting edges AB and BC are in the inactive position. It should be noted that the cutting edge AB, although being in a position that is conventionally defined as inactive because in conventional inserts it does not work, in the insert according to the invention, which offers better milling cutter utilization conditions than allowed by conventional inserts, can work by way of its portion that protrudes from the body of the milling cutter 2 toward the workpiece 7, arranged so as to face frontally the milling cutter 2.

The main cutting edges AB and CD can be mutually swapped, in that they can be moved selectively into the active or inactive position, and the same occurs accordingly for the secondary cutting edges AD and BC by way of the rotation of the insert through an angle of substantially 180° about an axis 8 that is substantially perpendicular to the upper surface of the insert. In order to allow this rotation, the insert can be crossed centrally by a hole 9 whose axis coincides with the axis 8, which is also used to fix the insert to the body of the milling cutter 2, or can be simply fixed to the body of the milling cutter by virtue of means of a known type, such as for example wedge-like locking elements or other locking means that can be removed at least partially in order to allow to rotate the insert about the axis 8 and fix it to the body of the milling cutter in the new position.

The region where the secondary cutting edge AD encounters the main cutting edge DC, i.e., the region ideally identified by the point D, and the region where the secondary; cutting edge CB encounters the main cutting edge AB, i.e., the region identified by the point B, are arranged diagonally with respect to the upper face of the insert and constitute two tips of the cutting edges that are termed outer tips because they are meant to be located, in the position for using the cutting edges that extend from them, in the position, occupied by the tip D in the figure, that defines the outer cutting circumference $t_e$ of the milling cutter. Substantially, these tips, when the corresponding cutting edges are in the active position, are the most intensely stressed tips of the insert.

The other two tips, ideally identified by the points A and C, constitute two other tips, which are referenced as inner tips because in the position for using respectively the secondary cutting edge AD, shown in FIG. 1, and the secondary cutting edge BC, they define the inner cutting circle $t_i$ of the milling cutter.

Figure 4:
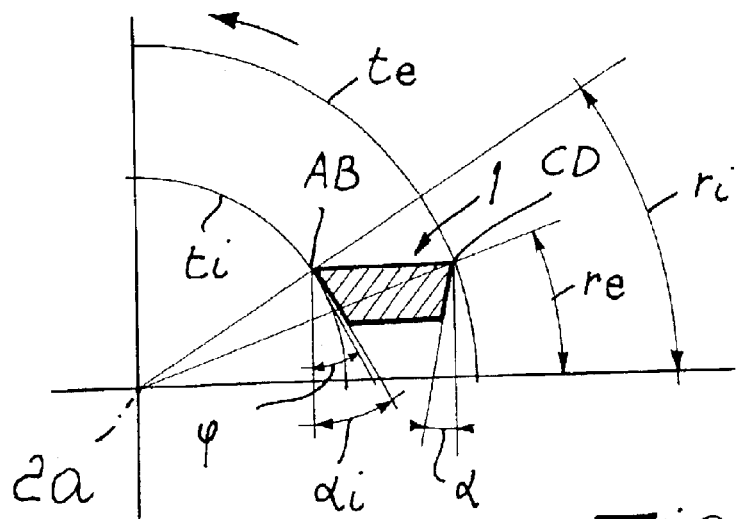
FIG. 4 is a schematic view of the cutting performed by the milling cutter with the insert according to the invention.

The inner cutting circle $t_i$ and the outer cutting circle $t_e$ are shown in FIG. 4, which also shows the outer radial angle $r_e$, which is constituted by the angle formed by an ideal plane that passes through the axis 2a of the milling cutter and through the active outer tip D and an ideal plane that again passes through the axis 2a and is parallel to the upper plane of the insert, and the inner radial angle $r_i$, constituted by the angle formed by an ideal plane that passes through the axis 2a of the milling cutter and the active inner tip A and the same ideal plane that passes through the axis 2a and is parallel to the upper plane of the insert.

With reference to said FIG. 4, it should be noted that the radial angles $r_e$ and $r_i$ according to the classic definitions in the milling sector are negative.

According to the invention, the lateral faces 3 and 5, which connect the main cutting edges AB and CD to the lower face of the insert, have, proximate to the inner tips A and C, positive lower relief angles $\alpha_i$ that are greater than the lower relief angles $\alpha$, which can be positive, negative or nil, proximate to the outer tips D and B. This difference is evident in FIG. 3.

The differentiation of the lower relief angle along the main cutting edges AB and CD allows a milling cutter that uses cutting edges according to the invention to perform three-dimensional millings from the solid without requiring the provision of pre-bores, since in the insert according to the invention it is possible to use not only all of the active secondary cutting edge (the cutting edge AD in the illustrated case) but also part of the main cutting edge in the inactive position (the cutting edge AB in the illustrated case).

The lower relief angle $\alpha_i$ proximate to the inner tips A, C is in the most extreme case at least equal to the inner radial angle $r_i$, but preferably it is greater, i.e., it meets the condition that allows the main cutting edge in the inactive position (constituted in the illustrated case by the cutting edge AB) to work by generating the inner cutting circle $t_e$.

As clearly shown in FIG. 4, the angle $r_i$ is in fact equal to the angle $\phi$ that constitutes the minimum lower relief angle required to allow the inner tip (in the illustrated case, the tip A) to encounter the part 7 and to cut.

Since along the main cutting edges AB, CD the relief angle is greater proximate to A and C and is smaller proximate to D and B, the strength of the outer tips D and B, which are the most intensely stressed tips of the insert, is not penalized.

Figure 5:
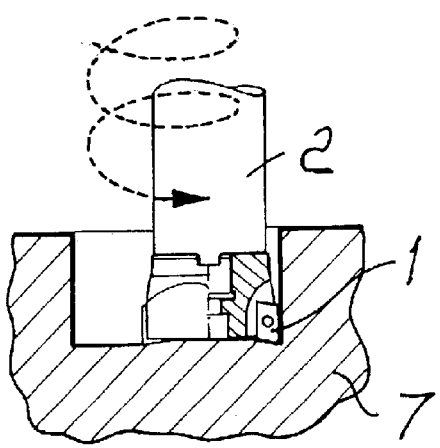
FIGS. 5 and 6 are views of two of the machinings that can be performed with a milling cutter equipped with inserts according to the invention.
Figure 6:
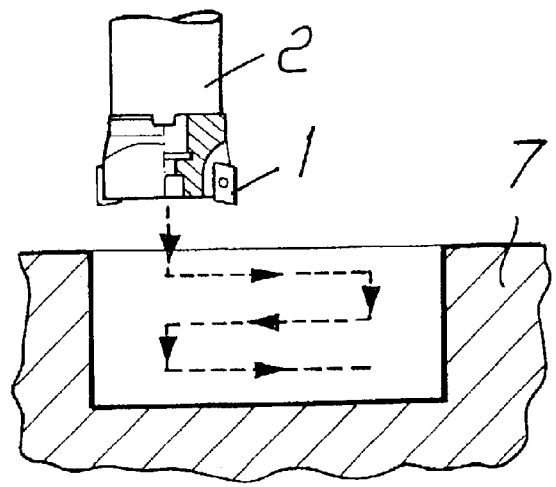

In this manner it is possible to perform millings along the paths shown in FIGS. 5 and 6 directly from the solid, i.e., without requiring the execution of preliminary bores, as instead required with inserts of the conventional type.

Figure 2:
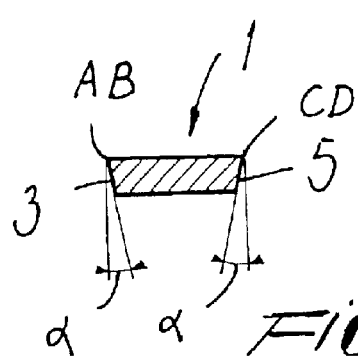
FIG. 2 is a sectional view of the insert, taken along the line II—II of FIG. 1.
Figure 3:
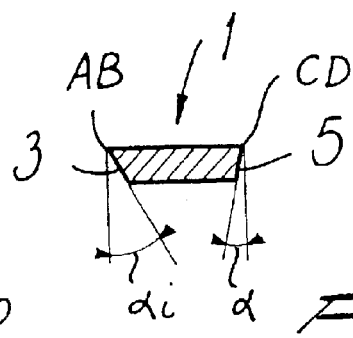
FIG. 3 is a sectional view of the insert, taken along the line III—III of FIG. 1.
Figure 8:
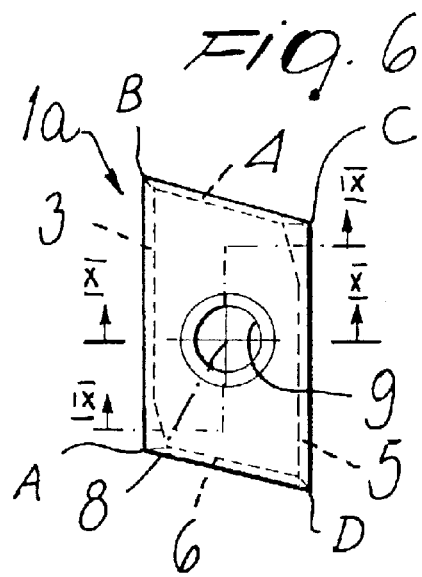
FIG. 8 is a view of another embodiment of the insert according to the invention, seen from its upper face.
Figure 9:
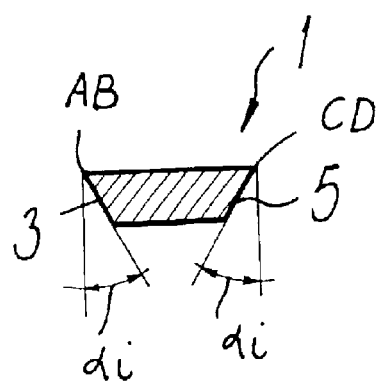
FIG. 9 is a sectional view of FIG. 8, taken along the line IX—IX.
Figure 10:
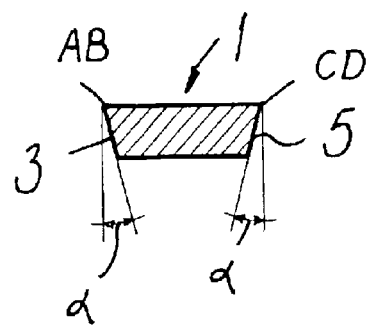
FIG. 10 is a sectional view of FIG. 8, taken along the line X—X.

The lower relief angle along the main cutting edges AB and CD can have a portion, starting from A and C, that has a constant larger breadth $\alpha_i$ and a subsequent portion that has a constant narrower breadth $\alpha$, as shown in the embodiment shown in FIGS. 1 to 3, or its breadth along a portion starting from A and from C can decrease gradually, as provided in the embodiment shown in FIGS. 8 to 10, in which the insert is generally designated by the reference numeral 1a.

The portion of the cutting edge AB and CD starting from A and C whose lower relief angle $\alpha_i$ is greater than the angle proximate to the outer tip D, B is preferably at least 1.8 mm long.

Furthermore, the lower relief angle $\alpha_i$ along the main cutting edges AB and CD proximate to A and C is preferably equal to at least 1.7 times the lower relief angle $\alpha$ along said cutting edges proximate to B and D, and in any case is not smaller than 4°.

Figure 11:
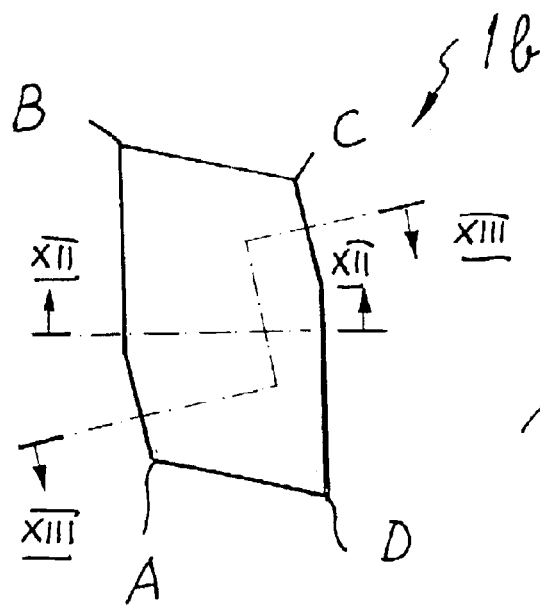
FIG. 11 is a view of a further embodiment of the insert according to the invention, seen from its upper face.
Figure 12:
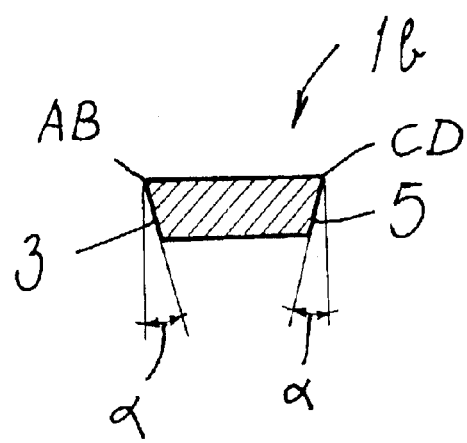
FIG. 12 is a sectional view of FIG. 11, taken along the line XII—XII.
Figure 13:
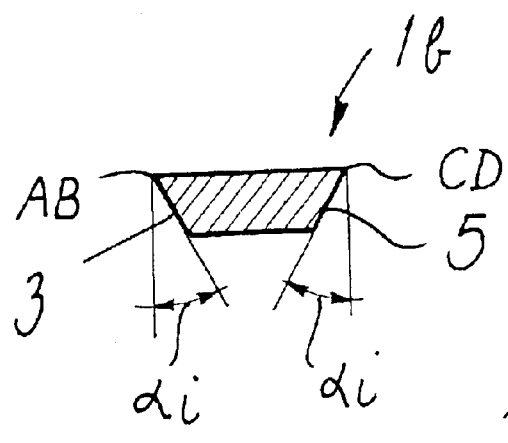
FIG. 13 is a sectional view of FIG. 11, taken along the line XIII—XIII.

In the embodiment shown in FIGS. 11 to 13, the insert according to the invention, generally designated by the reference numeral 1b, is again diamond-shaped with bevels at the regions of the inner tips A and C. Along said bevels, the lower relief angle $\alpha_i$ is positive and greater than the relief angle $\alpha$ along the remaining part of the main cutting edge, as shown by FIGS. 12 and 13.

Figure 7:
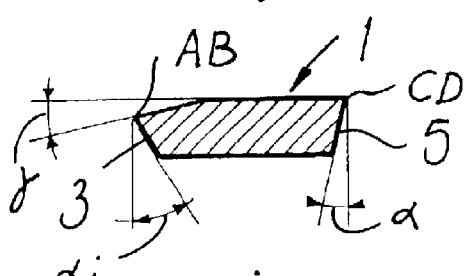
FIG. 7 is a sectional view, taken in a manner similar to FIG. 3, of a variation of the insert according to the invention.

If the main cutting edge must be stronger proximate to the inner tips A and C, this can be achieved by providing, proximate to said tips, as shown in FIG. 7, a bevel on he upper face of the insert, which forms a negative upper relief angle $\gamma$. It should be noted that this refinement has the effect of reducing the inner radial angle $r_i$ and of requiring therefore smaller lower relief angles $\alpha_i$ proximate to the inner tips A and C.

The main cutting edges AB and CD are substantially straight but can also be slightly curved so as to prevent deformations (parabolic, hyperbolic or others) on the milled wall due to the cutting geometry of the milling cutter. Moreover, recesses can be provided in order to achieve chip breakup.

The upper face of the insert can be flat or concave at least proximate to the cutting edges.

It should be noted that since the secondary cutting edges have no teeth or protrusions proximate to the outer tips, the insert according to the invention can be used on other kinds of milling cutters by using all four of its cutting edges as main cutting edges.

In practice it has been found that the insert according to the invention fully achieves the intended aim, since it allows to perform three-dimensional millings from the solid with milling cutters having a negative cutting edge radial angle while maintaining the possibility to use all the sides or cutting edges of the insert.

The insert thus conceived is susceptible of numerous modifications and variations, all of which are within the scope of the appended claims; moreover, all the details may be replaced with other technically equivalent elements.

In practice, the materials employed, as well as the dimensions, may be any according to requirements and to the state of the art.

The disclosures in Italian Patent Application No. MI2002A000294 from which this application claims priority are incorporated herein by reference.

What is claimed is:

1. A combination of a milling cutter with a four-sided insert for milling cutters, said insert comprising: cutting edges and a negative radial angle of the cutting edges for three-dimensional milling from a solid, having a lower face and an upper face, or rake face, that is delimited by four sides that constitute the cutting edges of the insert, said four sides being opposite in pairs and being connected to corresponding sides of the lower face by lateral faces, two opposite sides of said four sides constituting main cutting edges of the insert, the other two sides constituting secondary cutting edges, wherein the lateral faces that connect said main cutting edges to the lower face of the insert have, proximate to one end or tip of the cutting edge, a positive lower relief angle that is greater than the lower relief angle proximate to the other end or tip of said main cutting edge, further wherein the lower relief angle proximate to said one end of the inner tip or main cutting edge is greater than, or equal to, a negative inner radial angle formed by an imaginary plane that passes through the axis of the milling cutter onto which the insert is to be mounted and through the inner tip of the insert that faces the workpiece and by an imaginary plane that passes through the axis of the cutter and is parallel to the upper plane of the insert.

2. The combination according to claim 1, wherein the lower relief angle of the lateral face that connects each one of said main cutting edges to the lower face of the insert decreases gradually along at least one portion starting from said one end of the inner tip or cutting edge toward the other end of said outer tip or cutting edge.

3. The combination according to claim 2, wherein the lower relief angle of the lateral face that connects each one of said main cutting edges to the lower face of the insert proximate to said one end of the inner tip or the main cutting edge is substantially equal to at least 1.7 times the lower relief angle of said lateral face proximate to the other end of the outer tip or the main cutting edge, with a minimum of 4°.

4. The combination according to claim 2, wherein the lower relief angle of the lateral face that connects each one of said main cutting edges to the lower face of the insert proximate to said one end of the inner tip or cutting edge remains greater than the lower relief angle proximate to the opposite tip of said outer tip or cutting edge for at lest one portion measuring 1.8 mm along the corresponding main cutting edge starting from said one end of the inner tip or the main cutting edge.

5. The combination according to claim 2, wherein on the upper face of the insert, proximate to said one end of the main cutting edges or inner tip, there is a strengthening bevel that forms a negative upper relief angle for the main cutting edge.

6. The combination according to claim 5, wherein said insert has, at said inner tips, a bevel along which the lower relief angle is greater than the relief angle along the remaining part of said main cutting edges.

7. The combination according to claim 2, wherein the upper face of the insert is concave at at least at one of said cutting edges.

8. The combination according to claim 2, wherein the upper face of the insert is substantially flat.

9. The combination according to claim 2, wherein said upper face is rectangular.

10. The combination according to claim 2, wherein said upper face is square.

11. The combination according to claim 2, wherein said upper face is rhomboidal.

12. The combination according to claim 2, wherein said upper face is diamond-shaped.

13. The combination according to claim 2, wherein said secondary cutting edges are curved or jagged.

* * * * *